United States Patent [19]

Teramoto et al.

[11] Patent Number: 5,501,916
[45] Date of Patent: Mar. 26, 1996

[54] BATTERY HAVING A THROUGH-HOLE AND HEAT DISSIPATING MEANS

[75] Inventors: Kazunori Teramoto; Naoyuki Sugeno, both of Fukushima, Japan

[73] Assignee: Sony Corporation, Tokyo, Japan

[21] Appl. No.: 228,260

[22] Filed: Apr. 15, 1994

[30] Foreign Application Priority Data

| Apr. 15, 1993 | [JP] | Japan | 5-087709 |
| Jul. 27, 1993 | [JP] | Japan | 5-203778 |

[51] Int. Cl.$^6$ .......................... H01M 6/10; H01M 10/50
[52] U.S. Cl. .......................... 429/94; 429/120
[58] Field of Search .......................... 429/94, 120, 166

[56] References Cited

U.S. PATENT DOCUMENTS

| 2,385,127 | 9/1945 | Carlile | 429/120 X |
| 3,490,949 | 1/1970 | Deschamps | 429/94 |
| 3,682,706 | 8/1972 | Yardney et al. | |
| 4,189,527 | 2/1980 | Stadnick et al. | |
| 4,262,064 | 4/1981 | Nagle | |
| 5,183,222 | 2/1993 | Ramsey, Jr. | |
| 5,288,564 | 2/1994 | Klein et al. | |

FOREIGN PATENT DOCUMENTS

| 0044753 | 1/1982 | European Pat. Off. |
| 0531659 | 3/1993 | European Pat. Off. |
| 5166533 | 2/1993 | Japan |
| 53670 | 7/1967 | Luxembourg |
| WO79/00229 | 5/1979 | WIPO |

Primary Examiner—John S. Maples
Attorney, Agent, or Firm—Hill, Steadman & Simpson

[57] ABSTRACT

A battery has a through-hole traversing a battery main body and opened to outside. The battery has a vessel having a central through-hole, and a spiral-shaped electrode, made up of a strip-shaped positive electrode and a strip-shaped negative electrode wound about a cylindrical core a number of times with a separator in-between, is mounted in the battery vessel so that an opening of the cylindrical core is substantially coincident with the through-hole in the battery vessel. The battery vessel is sealed after charging a liquid electrolyte. One or more thin metal plates are inserted and secured in the through-hole, or one or more heat-dissipating fins are radially formed around the opening end of the through-hole. The battery has good heat-dissipating properties and is superior in strength and energy density.

7 Claims, 9 Drawing Sheets

BATTERY HAVING A THROUGH-HOLE AND HEAT DISSIPATING MEANS

BACKGROUND OF THE INVENTION

This invention relates to a battery having excellent strength and high heat dissipating characteristics.

As an example of the prior-art battery, a secondary battery employed for heavy loads is explained by referring to FIGS. 1 and 2.

In FIGS. 1 and 2, a conventional columnar-shaped battery shown in a perspective view and a cross-sectional view taken along line A—A in FIG. 1, respectively.

A columnar-shaped battery 30, a secondary battery used for heavy loads, usually has a columnar-shaped casing 31 as shown in FIG. 1. The inner structure of the battery 30 is shown in FIG. 2, in which a spiral-shaped electrode 34, formed by winding strip-shaped positive and negative electrodes with an interposed separator a large number of times around a center 35 is fitted in a cup-shaped negative electrode casing 31A, with a negative electrode lead 36 being welded to the negative electrode casing 31A and a positive electrode lead 37A being welded to a positive electrode lead 37B which is connected planar positive electrode plate 31B. After a liquid electrolyte is charged into the negative electrode casing 31A, the negative electrode casing 31A is caulked to the positive electrode casing 31B via a gasket 38 for sealing.

The columnar-shaped battery 30 having the above-described structure is subject to storage of heat and rise in temperature due to the heat of reaction of the electrodes resulting from charging/discharging and the Joule heat by the current flowing through the electrodes or the current collectors. Referring to FIG. 8, showing the temperature distribution for the columnar-shaped battery 30, the rise in temperature, which is decreased towards the outer peripheral surface of the battery 30, becomes maximum at its mid region 33, thus leading to shortened service life and occasionally to internal shorting or seal breaking.

Such phenomenon becomes outstanding when the battery is increased in size, For combatting such phenomenon, the cooling fluid may be caused to flow through the outside of the battery, or a liquid electrolyte within the battery may be connected to a heat sink and circulated by a pump. However, the energy density of the electric source system in its entirety is lowered due to the increase in volume or weight caused by the provision of the cooling system.

As means for solving the temperature related problem, it has been proposed to provide a structure in which heat exchange with air may be achieved easily on the battery surface or on the lead plate, such as by increasing the surface area of the battery.

The basic structure for increasing the surface area of the battery includes a planar structure or an elongated structure. However, if these structures are employed, the battery itself tends to be lowered in strength or to become deformed or bloated under external or internal pressure. Although the battery casing may be increased in thickness for increasing its strength, the energy density per unit area of the battery is thereby lowered.

SUMMARY OF THE INVENTION

It is an object of the present invention to provide a battery whereby the problem of temperature rise may be overcome without decreasing the energy density or mechanical strength.

For accomplishing the above object, the present invention provides a battery in which a through-hole traversing a main battery body and opened to outside is formed at a central region of the main battery body.

By forming the through-hole traversing the main battery body so as to be opened to outside, the heat generated by charging/discharging is dissipated through the through-hole to suppress the rise in temperature.

According to the present invention, only the through-hole is formed as heat dissipating means, while there is no necessity of providing complex cooling means for heat dissipation. Consequently, the energy density is not lowered due to the weight or the capacity of the cooling means. Also, the surface area of the battery may be maintained without the necessity of using a planar or elongated shape of the battery, so that the battery itself is not lowered in strength.

Also, by inserting and securing one or more thin metal plates in the through-hole or forming heat dissipating fins around the opening end of the through-hole, heat dissipation may be improved further, whereas the heat generated by charging/discharging of large current may be efficiently dissipated.

DESCRIPTION OF THE INVENTION

Figure 1:
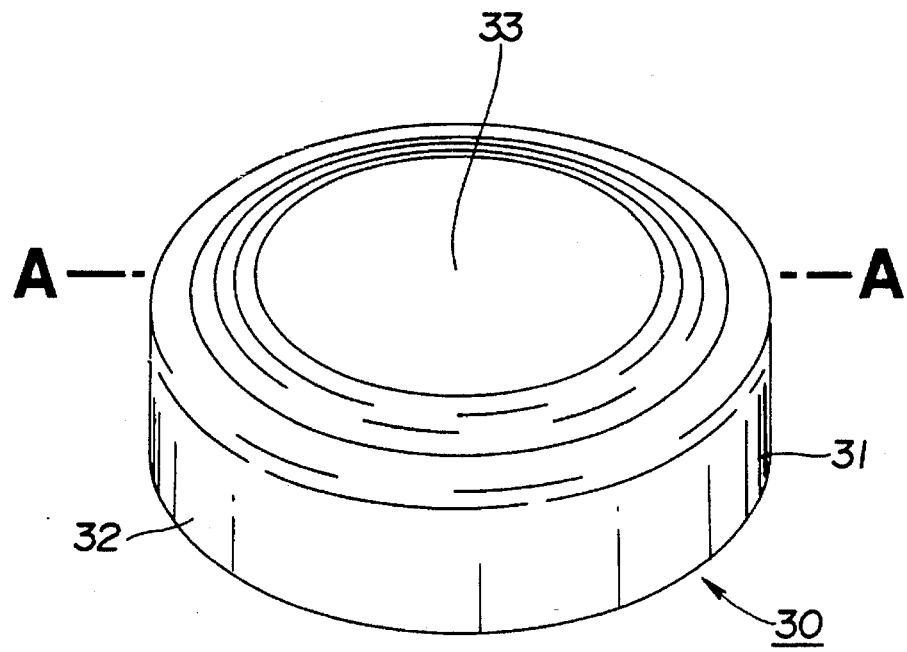
FIG. 1 is a perspective view of a conventional columnar-shaped battery.

The battery of the present invention includes a through-hole formed at the center of a main battery body so as to be opened to outside.

Specifically, the through-hole is formed by winding a strip-shaped positive electrode and a strip-shaped negative electrode about a cylindrical core a number of times with a separator in-between to form a spiral-shaped electrode and mounting the spiral-shaped electrode in a battery vessel having a central opening so that an opening of the cylindrical core is substantially coincident with the central opening of the battery vessel.

In the battery having the above structure, the cylindrical core may be constituted by an electric conductor and electrically insulated from the battery vessel, while being electrically connected to one of the positive electrode and the negative electrode of the spiral-shaped electrode so as to be used as a battery electrode. Similarly, the battery vessel may be used as an oppositely poled battery electrode.

One or more thin metal plates may also be inserted into and secured in the through-hole, or radial heat-dissipating fins may be formed around the opening end of the through-hole for further improving the heat dissipation properties.

The present invention may be applied to any type of the batteries. However, it is preferably applied to a high-output non-aqueous electrolyte secondary battery.

A large-sized non-aqueous electrolyte secondary battery is required to cope with the charging/discharging of a larger currant. For example, a lithium secondary battery employing a non-aqueous solvent is designed to accommodate large current through various improvements because the electrical conductivity of the liquid electrolyte is extremely low as compared to that of the aqueous solution. It is however feared that considerable amount of heat may be generated under the conditions of charging/discharging the larger current.

In particular, charging/discharging under the current condition of 2C to 10C is possible with the aqueous solution battery, whereas the improved lithium battery may be used only under the condition of 2C or less. If the latter condition is not observed, voltage drop by the internal resistor and heat generation become outstanding such that the desirable battery performance cannot be displayed.

Consequently, by applying the present invention to the nonaqueous electrolyte secondary battery, it becomes possible to effect charging/discharging of the large current.

The non-aqueous electrolyte secondary battery may be constructed in any desirable manner. For example $LiM'_xM''_{1-x}O_2$, where $M'$ and $M''$ each denote one of metals selected from the group consisting of Co, Ni, PIn, Fe, Cr and V, may be used as an active positive electrode material, while a carbon material capable of doping and de-doping Li may be used as an active negative electrode material. Tn addition, $TiS_2$, $MoS_2$, $V_2O_5$ or $V_3O_6$ may be used as an active positive electrode material, while metal lithium or a lithium alloy may be used as an active negative material. Furthermore, sulfur and sodium may be used as an active positive electrode material and as an active negative electrode material, respectively.

DETAILED DESCRIPTION OF THE PREFERRED EMBODIMENTS

Referring to the drawings, preferred embodiments of the present invention will be explained in detail.

Embodiment 1

Figure 3:
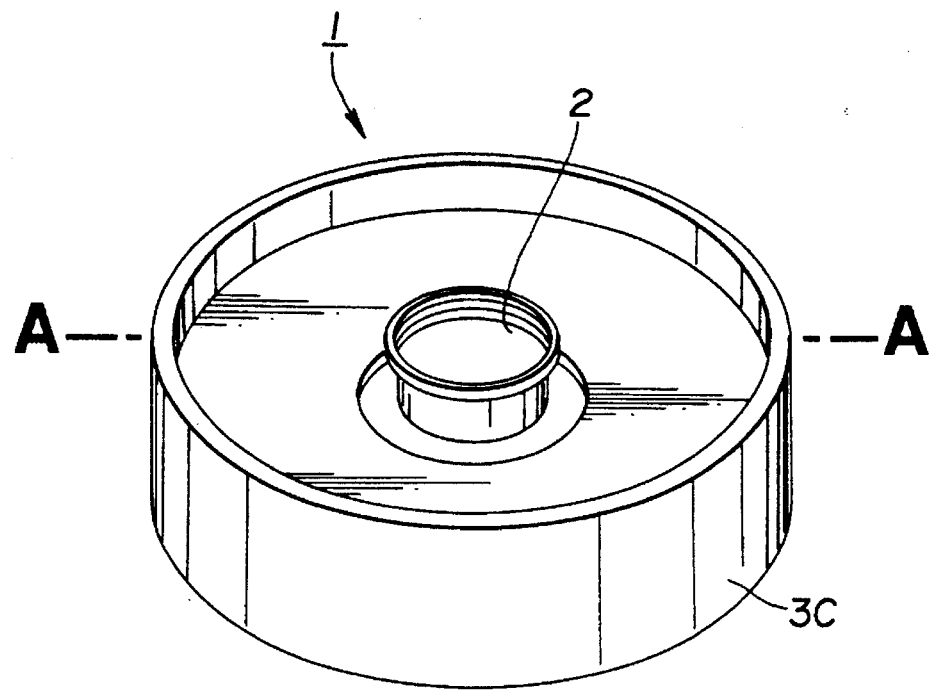
FIG. 3 is a schematic perspective view showing an embodiment of a columnar-shaped battery according to the present invention.
Figure 4:
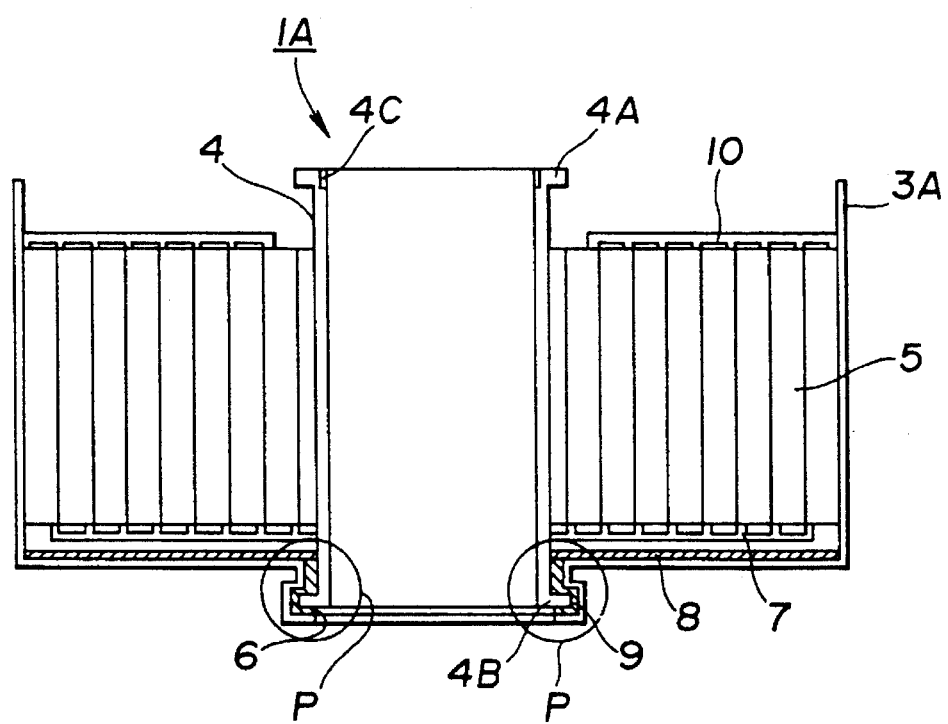
FIG. 4 is a schematic cross-sectional view showing the inner structure of the columnar-shaped battery shown in FIG. 3 during the fabrication process.
Figure 5:
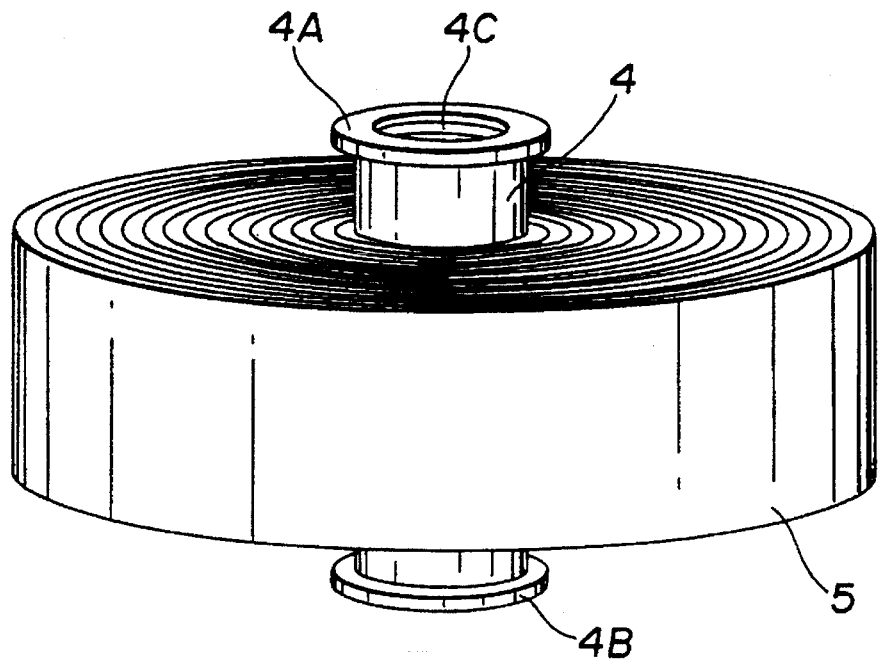
FIG. 5 is a perspective view showing a specified structure of the columnar-shaped battery shown in FIG. 3.
Figure 6:
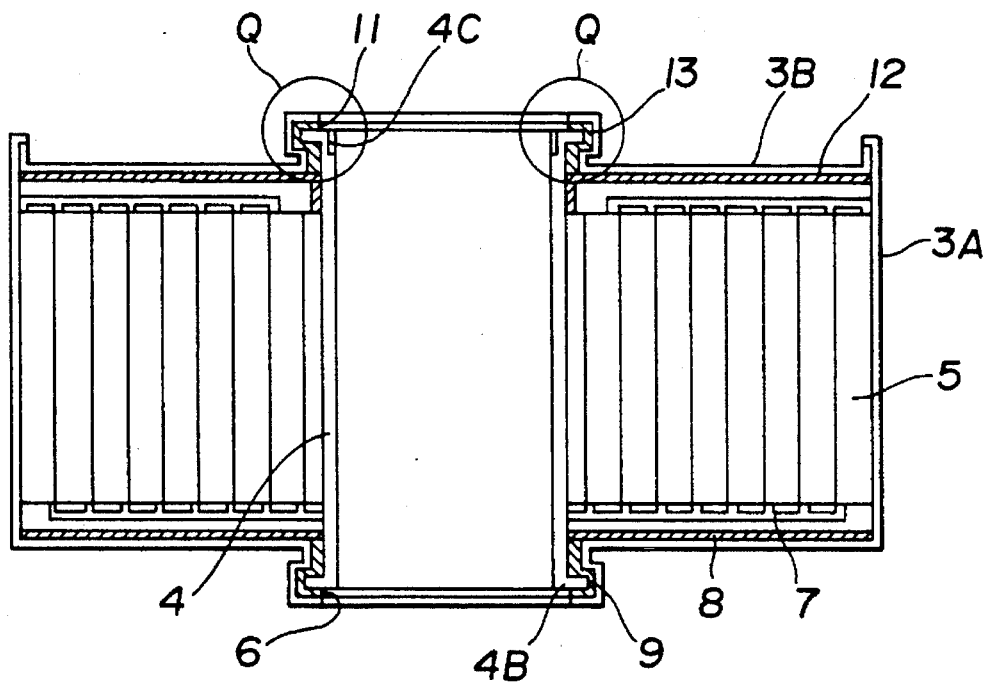
FIG. 6 is a schematic cross-sectional view showing the inner structure of the columnar-shaped battery shown in FIG. 5.
Figure 7:
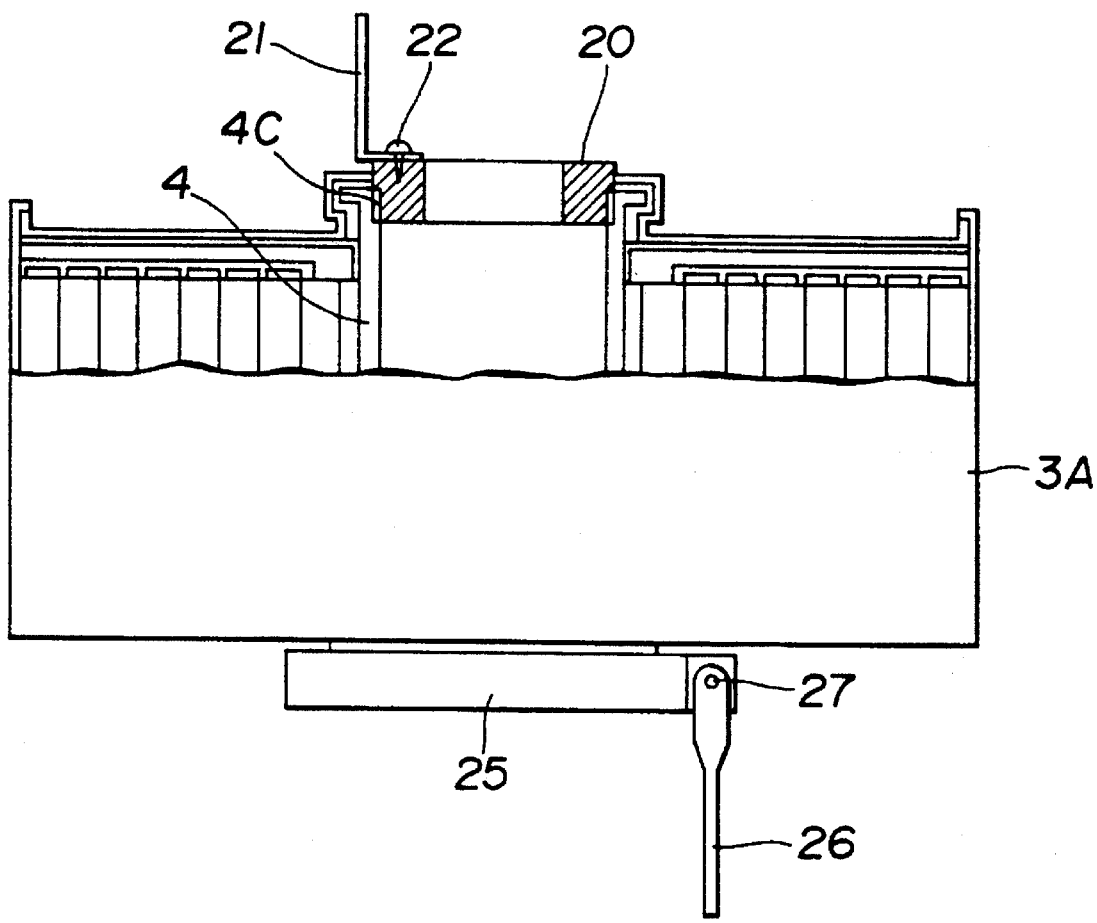
FIG. 7 is a partial cross-sectional view showing an example of the interconnection of the positive and negative electrodes with an external circuit when the columnar-shaped battery according to the present invention is in use.
Figure 8:
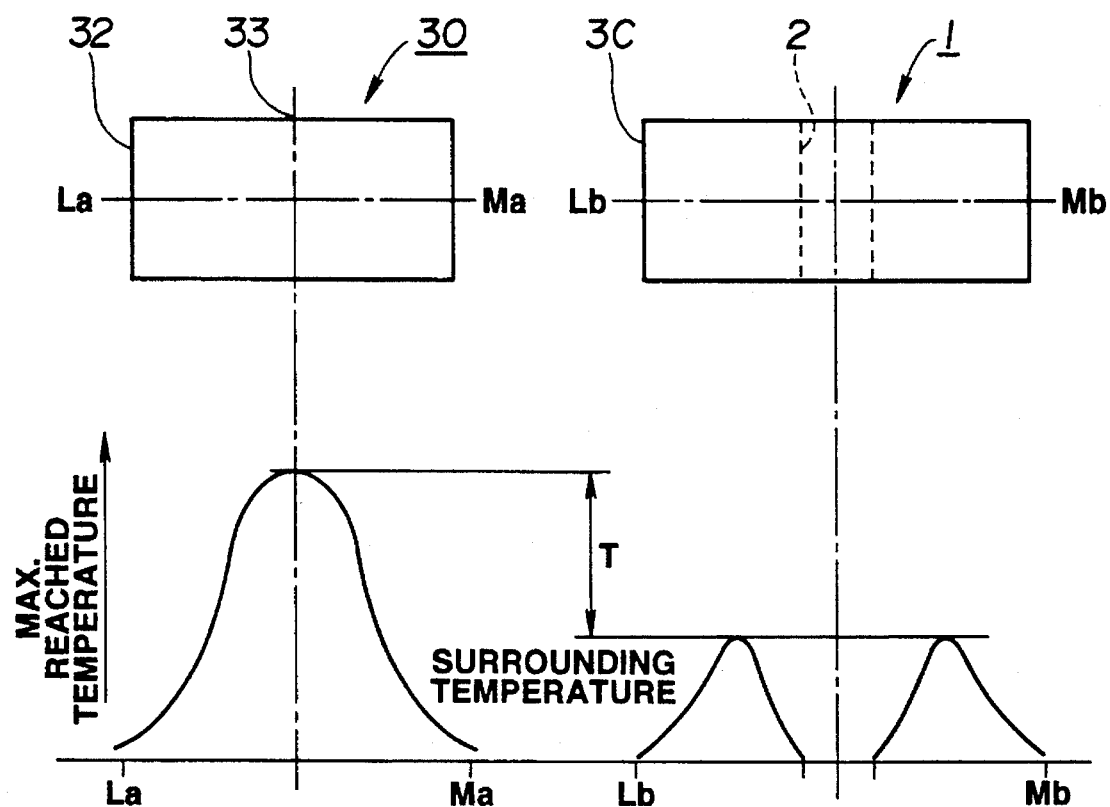
FIG. 8 is a graph showing the temperature distribution during discharge of the columnar-shaped battery according to the present invention and the conventional columnar-shaped battery.

FIG. 3 is a perspective view showing a columnar-shaped battery of the present embodiment. FIG. 4 is a schematic cross-sectional view showing the inner structure of the columnar-shaped battery shown in FIG. 3. FIG. 5 is a perspective view showing the structure of the cylindrical-shaped electrode and the spiral-shaped electrode assembled into the columnar-shaped battery shown in FIG. 4. FIG. 6 is a cross-sectional side view taken along line A—A in FIG. 3 and showing the inner structure of the columnar-shaped battery in the completely assembled state of the battery shown in FIG. 3. FIG. 7 is a cross-sectional side view showing an example of the interconnection of the positive and negative electrodes with an external circuit when the columnar-shaped battery according to the present invention is in use. FIG. 8 is a graph for comparison showing the temperature distribution during discharge of the columnar-shaped battery according to the present invention and the conventional columnar-shaped battery.

Referring to FIGS. 3 to 7, the structure of a battery according to the present embodiment is explained.

A battery 1 according to the present embodiment has a through-hole 2 at the center opened on both the upper and lower surfaces thereof, as shown in the perspective view of FIG. 3.

The battery 1 is made up of a lower negative electrode casing 3A, an upper negative electrode casing 3B (FIG. 6), a cylindrical-shaped positive electrode core 4 and a spiral-shaped electrode having positive and negative electrodes, as shown in FIGS. 4 and 5.

Referring to FIGS. 4 to 6, the inner structure of the battery 1 is now explained in connection with the assembling method thereof.

In FIG. 4, a battery half is indicated by a reference numeral 1A. The lower negative electrode casing 3A is formed as a cup having a circular opening 6 at a mid part, of the bottom thereof. The upper negative electrode casing 3B is planar and has a circular opening 11 at the center thereof, as shown in FIG. 6.

The cylindrical-shaped positive electrode core 4 has its length slightly longer than the depth of the lower negative electrode casing 3A, and is provided with an upper flange 4A and a lower flange 4B. A female screw thread 4C having a length of approximately 5 mm is tapped beginning from the opening end of the inner periphery of the cylindrical-shaped positive electrode core 4 of the flange 4A.

The spiral-shaped electrode 5 is formed by winding strip-shaped positive and negative electrodes with an interposed separator a large number of times around the periphery of the cylindrical-shaped positive electrode core 4, so that the positive and negative electrodes face each other with the interposition of the separator, as shown in FIG. 5.

When assembling the battery half 1A, made up of the abovementioned components, a lower insulator 8 is placed on the bottom of the lower negative electrode casing 3A.

On the other hand, a positive electrode lead 7 is welded to the spiral-shaped electrode 5 in the state shown in FIG. 5. The spiral-shaped electrode 5 in this state is mounted on the lower negative electrode casing 3A, by fitting the flange 4B of the centrally disposed cylindrical-shaped positive electrode core 4 in the opening 6 of the lower negative electrode casing 3A so that the flange 4B is protruded downwards from the bottom of the lower negative electrode casing 3A. The flange 4B protruded downwards is caulked to the opening 6 by means of a lower gasket 9 at P in FIG. 6 for sealing the one side of the battery half. A negative electrode is then welded by a negative electrode lead 10 to the inner periphery of the lower negative electrode casing 3A.

After a liquid electrolyte is injected into the inside of the lower negative electrode casing 3A, an upper insulator 12 is placed on the casing 3A. The upper negative electrode casing 3B is placed on the upper insulator 12 so that the upper end of the cylindrical-shaped positive electrode core 4 is protruded via an opening 11 of the upper negative electrode casing 3B. The upper negative electrode casing 3B and the lower negative electrode casing 3A are connected to each other along the outer peripheral surfaces thereof. Finally, the upwardly protruded flange 4A of the cylindrical-shaped positive electrode core 4 is caulked to the opening 11 of the upper negative electrode casing 3B at Q in FIG. 6 to complete the sealing.

In distinction from the conventional columnar-shaped battery, the battery of the present embodiment has the central through-hole 2 so that it is similar in shape to a cylinder. Consequently, the battery is referred to herein as a cylindrical-shaped battery for distinction from the conventional battery.

Referring to FIG. 7, a typical interconnection between the positive and negative electrodes and an external circuit, when employing the cylindrical-shaped battery, is now explained.

The interconnection at the positive electrode is by a copper ring 20. A male screw thread is formed on the peripheral surface of the copper ring 20 and an electrical line 21 connected to the external circuit is connected by a set screw 22 mounted on the upper surface of the ring 6. The cylindrical-shaped positive electrode core 4 may be interconnected to the external circuit by threading the copper ring 20 in the female screw 4C tapped on the inner peripheral surface of the cylindrical-shaped positive electrode core 4.

The interconnection on the negative electrode side is by a copper band 25. The copper band 25 is wound one turn around the caulked part of the opening 6 of the negative electrode casing 31A. The electrode end of the copper band 25 is secured with a screw 27 along with the electrical cable 26 connected to the external circuit for connecting the negative electrode side of the cylindrical-shaped battery 1.

The outer shape and the size of the copper ring 20 were set to, for example, an outer diameter of 20 mm, an inner diameter of 20 mm and a thickness of 10 mm, based upon the relation of the embodiment to be described hereinbelow. The copper band 25 was of a thickness of 0.5 mm.

An embodiment and a comparative embodiment, in which a nonaqueous liquid electrolyte secondary battery has the abovedescribed battery structure will now be explained.

10 to 20 wt % of oxygen-containing functional groups were introduced into petroleum pitch used as a starting material for the negative electrode. The resulting assembly was sintered in an inert gas stream at 1000° C. to give a carbonaceous material which was pulverized to powders of a carbon material having a particle size of 0.02 mm. 90 parts by weight of the powders of the carbon material as the active negative electrode material and 10 parts by weight of a vinylidene fluoride resin as a binder were mixed to give a negative electrode mixture which was then dispersed in a solvent N-methyl pyrrolidone to give a negative electrode mixture slurry.

A band-shaped copper foil, 0.04 mm thick, was used as a negative electrode current collector. The above-mentioned negative electrode mixture slurry was coated on both sides of the current collector. The resulting assembly was dried and compression molded to produce a strip-shaped negative electrode. The thickness of the mixture on each side of the as-molded negative electrode was set to 0.10 mm. The width and the length of the electrode were set to 40 mm and 19000 mm, respectively.

For producing the positive electrode, 91 parts by weight of $LiCoO_2$ powders, having a mean particle size of 0.015 mm, 6 parts by weight of the graphite as a current conductive agent, and 3 parts by weight of the vinylidene fluoride resin as a binder, were mixed together and the resulting mixture was dispersed in N-methyl pyrrolidone to give a positive electrode mixture slurry.

A band-shaped aluminum foil, 0.05 mm thick, was used as a positive electrode current collector. The above-mentioned positive electrode mixture slurry was coated on both sides of the current collector and the resulting assembly was dried and compression molded to give a strip-shaped positive electrode. The thickness of the mixture on each side of the as-molded positive electrode was set to 0.10 mm, while the width and the length of the electrode were 38.5 mm and 18900 mm, respectively.

The strip-shaped positive and negative electrodes were stacked with the interposition of a polypropylene film which has fine pores and which is 0.03 mm in thickness, 45 mm in width and 19500 mm in length. The resulting stacked film was wound around the cylindrical-shaped positive electrode core 4 shown in FIG. 5 to produce a spiral-shaped electrode 5.

As the liquid electrolyte, a solution of $LiPF_6$ in a mixed solvent composed of equal volumes of propylene carbonate and diethyl carbonate at a rate of 1 mol/liter was employed.

The outer shape and the size of the completed cylindrical-shaped non-aqueous liquid electrolyte battery except the sealed openings 6 and 11 were 120 mm in diameter and 50 mm in height. The diameter of the through-hole 2 was 30 mm, while the electrical capacity was 30 Ah.

Figure 2:
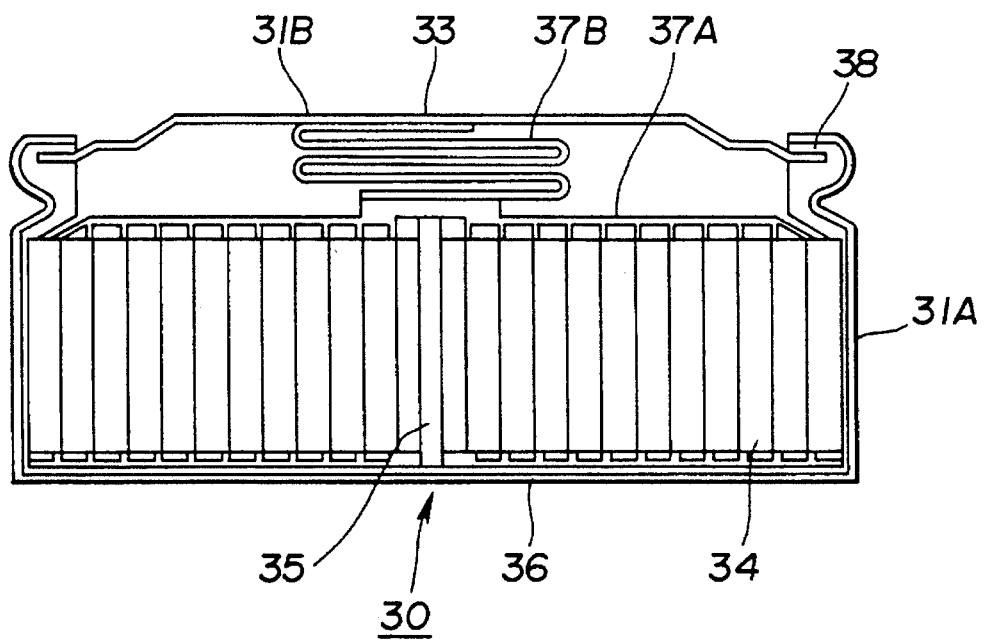
FIG. 2 is a cross-sectional view taken at line A—A in FIG. 1.

On the other hand, the same strip-shaped positive and negative electrodes as those produced in the Example were stacked with the interposition of the same polypropylene film having fine pores and the resulting stacked films were wound a large number of times around a center pin 35 which was 3 mm in diameter to produce a spiral-shaped electrode 34 (FIG. 2). The spiral-shaped electrode 34 was mounted on a negative electrode casing 31A. The same liquid electrolyte as that used in the Example was charged and the openings were sealed to complete a cylindrical-shaped non-aqueous liquid electrolyte battery 30 by way of the Comparative Example.

The cylindrical-shaped non-aqueous liquid electrolyte battery of the Comparative Example was 115.5 mm in diameter and 50 mm in height, with the electrical capacity being 30 Ah.

Five of the batteries of the Example and the Comparative Example were provided and charged for six hours at the constant current of 10 A with an upper electrical voltage set to 4.2 V. The batteries were then discharged up to 2.5 V in a constant temperature vessel maintained at 23° C. The maximum temperatures reached within the inside of the spiral-shaped electrodes of the Example and the Comparative Example, as measured on the outer periphery of each battery and a heat-sensitive temperature-indicating label, are shown in Table 1:

TABLE 1

|  | on the outer peripheral surface (°C.) | inside the electrode (°C.) |
|---|---|---|
| max. reached temperature of embodiment | 28 | 59 |
| max. reach reached temperature of comparative embodiment | 30 | 81 |

Five of the batteries of the Example and the Comparative Example were provided and charged for ten hours at the constant current of 10 A with an upper electrical voltage set to 5 V. The changes in size along the radius and the height of each battery were measured. The results are shown in Table 2.

TABLE 2

|  | change in radial size (mm) | change in vertical size (mm) |
|---|---|---|
| max. size change of embodiment | +1 | +2 |
| max. size change of comparative embodiment | +1 | +9 |

It is seen from Tables 1 and 2 that the cylindrically-shaped hermetically sealed battery 1 of the Example undergoes temperature rise in the battery and changes due to increase in the internal pressure to a lesser extent.

Since the battery 1 of the present Example has the through-hole at the central portion which is subject to the maximum rise in temperature due to heat storage of the columnar-shaped structure in the case of the battery of the Comparative Example, the battery 1 shows a temperature distribution shown at the right side of FIG. 8, such that a difference T is produced between the maximum temperature reached by the battery 1 of the Example and that reached by the battery 30 of the Comparative Example.

This indicates that the central through-hole 2 has the function of creating a larger surface area for lowering the heat storage of the battery in its entirety and reducing the temperature difference in the battery.

The battery 1 of the present Example may be improved in heat dissipation properties by causing the cooling air to flow through the through-hole 2.

As to the aspect of mechanical strength, the columnar-shaped battery 30 having no through-hole as shown in FIGS. 1 and 2 has a high strength and scarcely undergoes deformation on increase of the internal pressure because of the sloped lateral sides. However, the upper and lower planar sides are low in strength and susceptible to deformation. The cylindrical structure of the present Example shown in FIG. 3 is susceptible only to slight deformation of the upper and lower surfaces, with the inner peripheral surface delimiting the through-hole 2 playing the role of a pillar interconnecting the upper and lower sides.

By this pillar effect, there is no necessity of increasing the thickness of the material of the battery casing for the purpose of increasing the mechanical strength, so that the energy density per unit weight is not lowered.

Example 2

10 to 20% of the oxygen-containing functional groups were introduced into the petroleum pitch used as the starting material of the negative material by way of oxygen crosslinking. The resulting mass was heat-treated at 1000° C. in an inert gas stream for producing a carbon material having the properties similar to those of the vitreous carbon. X-ray analyses and measurements of the carbon material have revealed that the spacing of the (002) plane was 3.76 Å. The carbon material was pulverized to powders of carbon material having a mean particle size of 20 µm.

90 parts by weight of the produced powders of the carbon material and 10 parts by weight of poly-vinylidene fluoride (PVDF) as a binder were mixed to give a mixture for the negative electrode. This mixture was dispersed in a solvent N-methyl 2-pyrrolidone to give a negative electrode mixture slurry which was then coated uniformly on both sides of a strip-shaped copper foil having a thickness of 20 µm. The resulting mass was dried and compression molded by a roll press to produce a strip-shaped negative electrode.

0.5 mol of lithium carbonate and 1 tool of cobalt carbonate, as the active positive electrode materials were mixed and sintered in air at 900° C. for five hours. A positive electrode mixture was prepared by mixing 91 parts by weight of $LiCoO_2$, 6 parts by weight of graphite as an electrically conductive agent and 3 parts by weight of poly-vinylidene fluoride as a binder.

The positive electrode mixture was dispersed in a solvent N methyl 2 pyrrolidone to give a positive electrode mixture slurry which was then coated uniformly on both sides of a strip-shaped aluminum foil 30 Mm thick as a positive electrode current collector. The resulting mass was dried and compression molded to give a strip-shaped positive electrode.

Figure 9:
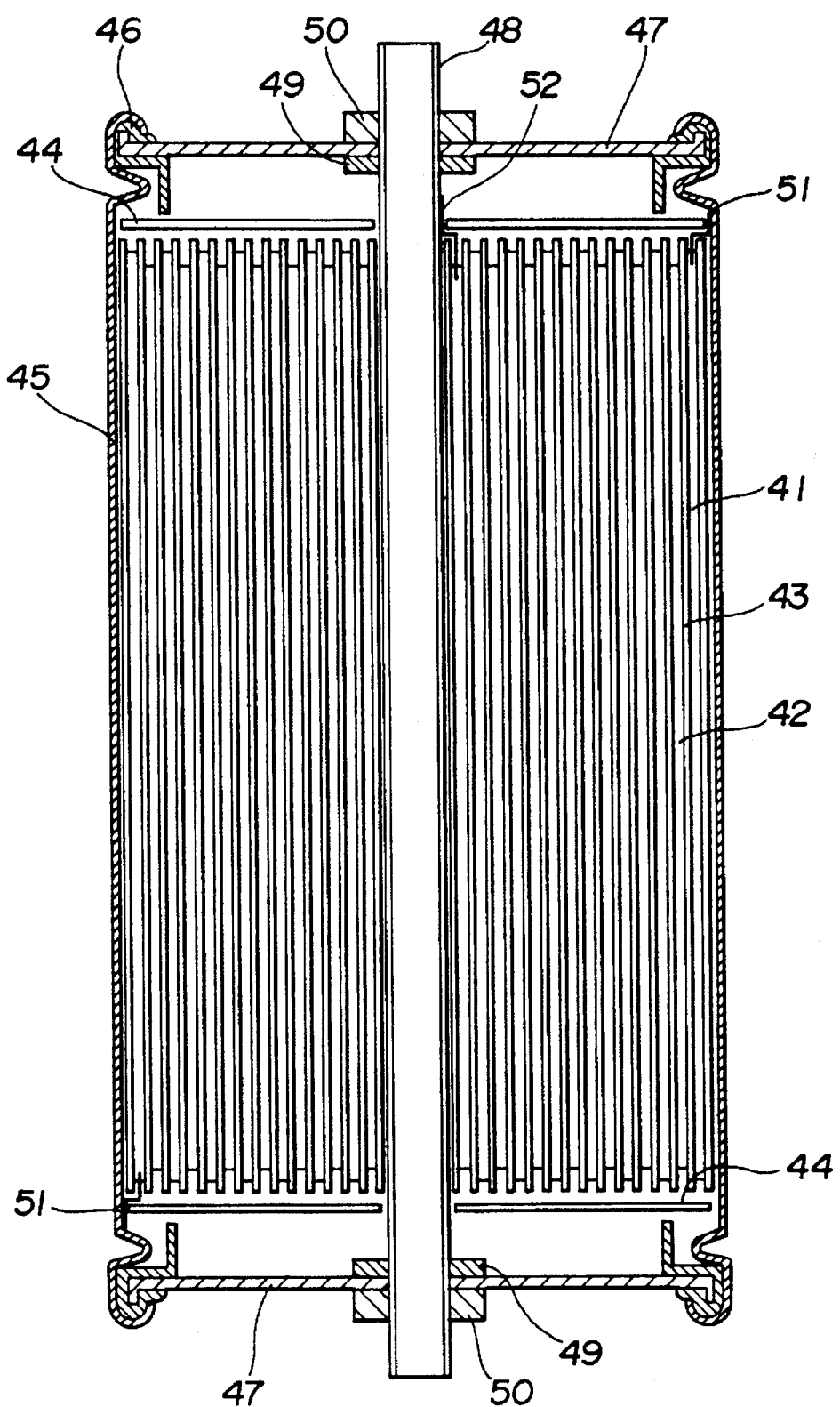
FIG. 9 is a schematic cross-sectional view showing another example of the columnar-shaped battery according to the present invention.

An aluminum hollow tube, having an outer diameter of 20 mm, an inner diameter of 16 mm and a length of 200 mm, was used as a battery winding core 48 (FIG. 9), and a strip-shaped negative electrode 41, a strip-shaped positive electrode 42 and a separator 43 consisting of a polypropylene film having fine pores and a thickness of 38 mm were stacked in the sequence of the negative electrode, separator and the positive electrode to provide stacked films which were wound a number of times around the winding core to produce a spiral-shaped electrode device as shown in FIG. 9.

An aluminum lead 52 was drawn out from the positive electrode current collector of the spiral-shaped electrode element thus produced and was welded to the battery winding core 48. A negative electrode lead formed of nickel 51 was also drawn out from the negative electrode current collector. The electrode element was contained in a nickel-plated iron vessel (battery can) 45 and the negative electrode lead 51 was connected to the battery can 45, An insulating plate 44 was placed on each of the upper and lower sides of the spiral-shaped electrode element.

A battery lid 47, secured to the battery winding core 48 with set screws 49, 50, was caulked in position by an insulating gasket 46 coated with asphalt. A liquid electrolyte, a mixture composed of 1 mol of $LiPF_6$ dissolved in a liquid mixture composed of equal amounts of propylene carbonate and diethyl carbonate, was then injected into the electrode element. Another battery lid 47 was similarly secured by set screws 49, 50 and caulked to the battery can 45 by an insulating gasket 46 coated with asphalt to produce a cylindrical-shaped non-aqueous liquid electrolyte secondary battery having a diameter of 50 mm and a height of 200 mm.

Figure 10:
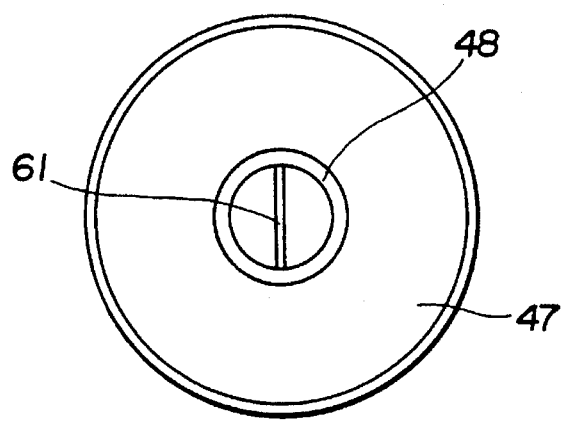
FIG. 10 is a plan view showing the state in which a thin metal plate is mounted in a through-hole.

An aluminum plate 61, 1 mm in thickness, 16 mm in width and 200 mm in length was mounted within the battery winding core 48 as shown in FIG. 10 to provide a sample 1.

Figure 11:
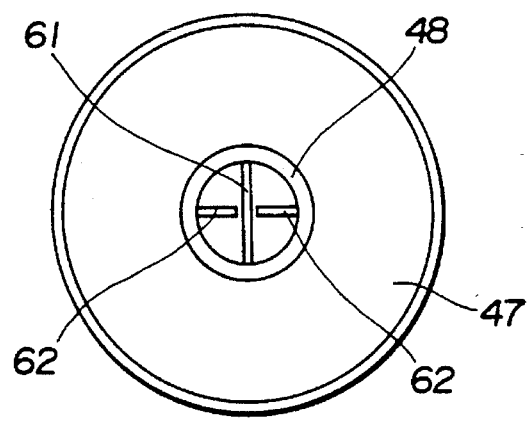
FIG. 11 is a plan view showing the state in which three thin metal plates are mounted in a through-hole.
Figure 12:
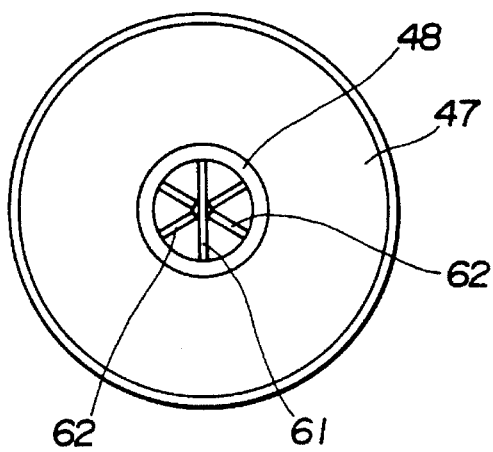
FIG. 12 is a plan view showing the state in which five thin metal plates are mounted in a through-hole.
Figure 13:
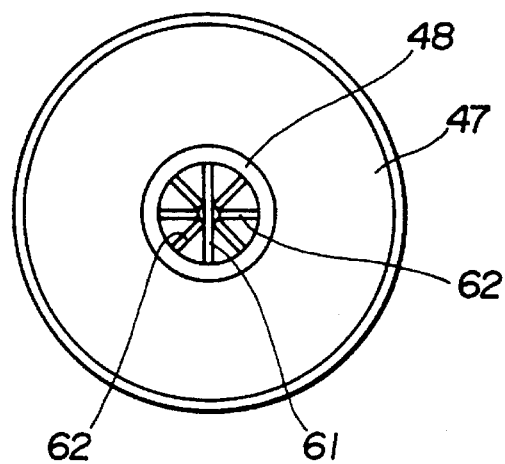
FIG. 13 is a plan view showing the state in which seven thin metal plates are mounted in a through-hole.

In addition to the aluminum plate 61, two, four and six aluminum plates 62, each 1 mm in thickness, 7 mm in width and 200 mm in length were radially mounted at equal angles as shown in FIGS. 11, 12 and 13, to provide samples 2, 3 and 4, A battery having the inside of the battery winding core 48 remaining hollow was also prepared as a comparison sample 1.

These batteries were charged for the first operation to an upper voltage of 4.2 V with a current of 5 A and were discharged to 2.5 V with the current of 10 A. From the second operation on, the current of 10 A was used, and the cycle of charging for 4 hours with the upper limit voltage of 4.2 V and discharging to 2.5 V with the current of 10 A was repeated ten times. At this time, the battery capacity during discharging and the temperature within the battery winding core 48 were measured. The results are shown in Table 3.

TABLE 3

|  | first cycle capacity (mAh) | fifth cycle | | tenth cycle | |
| --- | --- | --- | --- | --- | --- |
|  |  | capacity (mAh) | max. temperature (°C.) | capacity (mAh) | max. temperature (°C.) |
| sample 1 | 15.5 Ah | 14.6 Ah | 41 | 14.1 Ah | 41 |
| sample 2 | 15.6 Ah | 14.5 Ah | 37 | 14.0 Ah | 37 |
| sample 3 | 15.6 Ah | 14.5 Ah | 34 | 14.0 Ah | 33 |
| sample 4 | 15.6 Ah | 14.5 Ah | 31 | 14.0 Ah | 31 |
| comp. sample 1 | 15.4 Ah | 14.6 Ah | 45 | 14.1 Ah | 45 |

Then, with the current of 10 A, the batteries were charged for four hours with the upper limit voltage of 4.2 V and discharged up to 2.5 V with the current of 50 A. At this time, the battery capacity during discharging and the temperature within the battery winding core 48 were measured. The results are shown in Table 4.

TABLE 4

|  | discharge capacity (mAh) | specific capacity (50 A/10 A) | max. temperature (°C.) | surface area of heat dissipating/ surface area of outer peripheral surface of cylinder |
| --- | --- | --- | --- | --- |
| sample 1 | 9.3 Ah | (66.0%) | 70 | 0.10 |
| sample 2 | 9.5 Ah | (67.9%) | 63 | 0.20 |
| sample 3 | 10.1 Ah | (72.1%) | 57 | 0.29 |
| sample 4 | 10.8 Ah | (77.1%) | 54 | 0.36 |
| comp. sample 1 | 9.2 Ah | (65.2%) | 75 | — |

It is seen from the above results that, if a hollow winding core is used in a large-sized cylindrical non-aqueous electrolyte secondary battery, it is effective to have one or more heat-dissipating thin plates within the inside of the core in order in to dissipate heat effectively large current charging/ discharging operations.

Example 3

The battery employed in the present Example was the same in structure as the battery of the previous Example 2. However, a sealing plate having heat-dissipating fins is used as a battery lid, instead of mounting one or more heat-dissipating thin plates within the cylinder.

Figure 14:
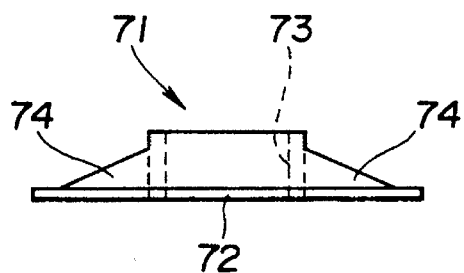
FIG. 14 is a side view showing a sealing plate or lid having a heat-dissipating fin.
Figure 15:
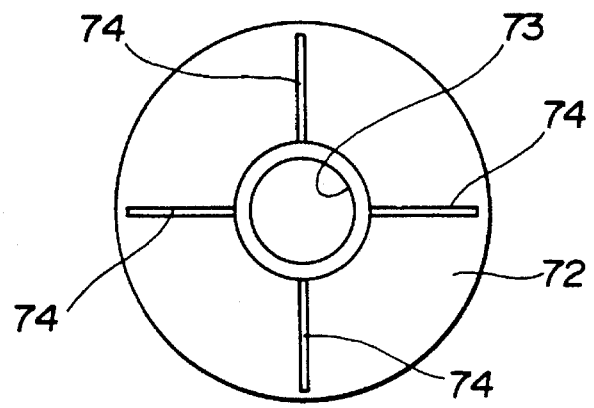
FIG. 15 is a plan view showing a sealing plate or lid having four heat-dissipating fins.
Figure 16:
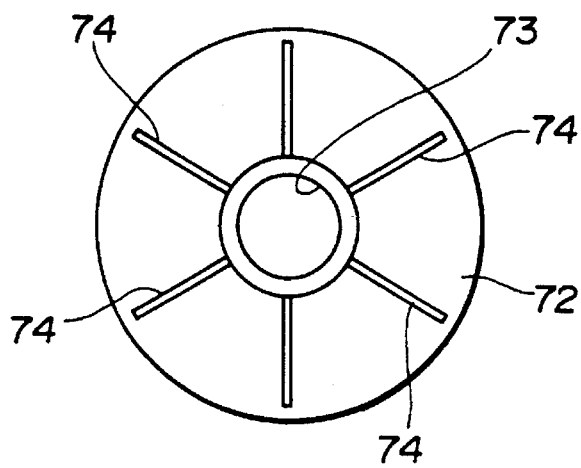
FIG. 16 is a plan view showing a sealing plate or lid having six heat-dissipating fins.
Figure 17:
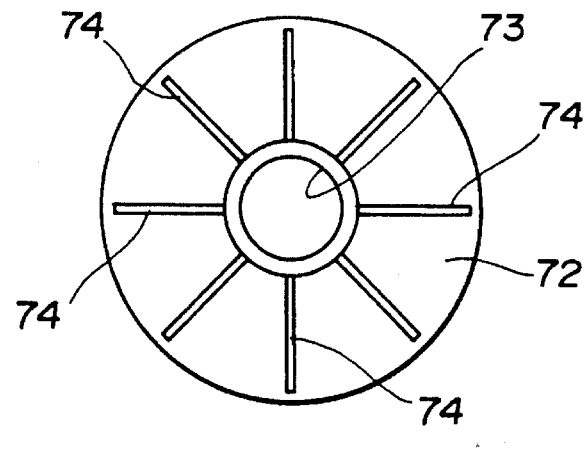
FIG. 17 is a plan view showing a sealing plate or lid having eight heat-dissipating fins.
Figure 18:
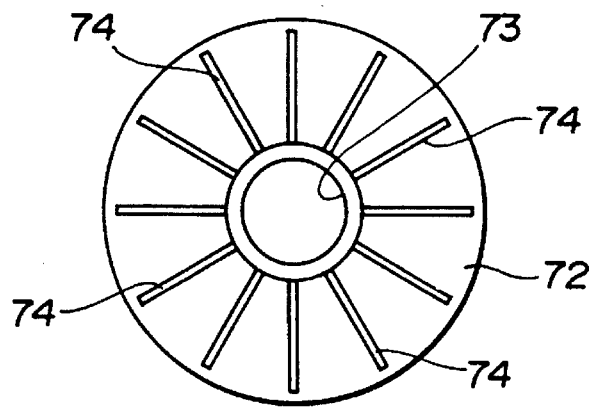
FIG. 18 is a plan view showing a sealing plate or lid having twelve heat-dissipating fins.

A sealing plate 71 formed of, for example, aluminum, includes a disc-shaped lid 72 acting as a battery lid, a center opening 73 passed through by the battery winding core 48, and heat-radiating fins 74 arranged radially around the center opening 73 as the center, as shown in FIG. 14. The heat radiating fins 74 are higher in height at the center and become lower in height towards the outer periphery.

In the present Example, the sealing plate 71 was secured with a set screw in place of the battery lid 47. Four, six, eight and twelve heat-dissipating fins 74 were used as shown in FIGS. 15, 16, 17 and 18 as samples 5, 6, 7 and 8, respectively. A sample having a sealing plate devoid of the heat-dissipating fins was also provided as a comparative sample 2.

Charging and discharging were carried out of these samples in the same way as in Example 2 and measurements were also made of the surface temperatures. The results are shown in Tables 5 and 6.

TABLE 5

|  | first cycle capacity (mAh) | fifth cycle | | tenth cycle | |
| --- | --- | --- | --- | --- | --- |
|  |  | capacity (mAh) | max. temperature (°C.) | capacity (mAh) | max. temperature (°C.) |
| sample 5 | 15.5 Ah | 14.6 Ah | 34 | 14.1 Ah | 34 |
| sample 6 | 15.6 Ah | 14.5 Ah | 34 | 14.0 Ah | 34 |
| sample 7 | 15.6 Ah | 14.5 Ah | 33 | 14.0 Ah | 33 |
| sample 8 | 15.6 Ah | 14.5 Ah | 33 | 14.0 Ah | 33 |
| comp. sample 2 | 15.4 Ah | 14.6 Ah | 35 | 14.1 Ah | 35 |

TABLE 6

|  | 30 A discharge condition | | 50 A discharge condition | |
| --- | --- | --- | --- | --- |
|  | discharge capacity | max. temperature(°C.) | discharge capacity | max. temperature (°C.) |
| sample 5 | 11.6 Ah | 43 | 9.3 Ah | 52 |
| sample 6 | 11.7 Ah | 41 | 9.5 Ah | 48 |
| sample 7 | 11.9 Ah | 39 | 10.1 Ah | 47 |
| sample 8 | 12.1 Ah | 38 | 10.2 Ah | 46 |
| comp. sample 2 | 11.2 Ah | 46 | 9.2 Ah | 58 |

It is seen from the above results that, if a battery is used under conditions of charging and discharging the large current, a sealing plate having radial heat-dissipating fins may be advantageously employed for facilitating the heat dissipation and reducing the heat stored in the battery.

Another merit of the present embodiment is that the sealing plate may be simultaneously reinforced and the number of production steps is not increased for producing the battery structure.

The heat-dissipating fins of the sealing plate provide an additional advantage that these may be utilized as connecting points for lead welding during battery connection. If a number of the above-described batteries are used as a battery set, the fact that the heat-dissipating fins of the sealing plate may be utilized as the structure for electrical connection means that ease in electrical connection of the batteries and suppression of heat evolution in the batteries may be realized simultaneously. Thus the properties of control equipment annexed to the batteries may be prevented from being lowered for suppressing accelerated deterioration of the battery service life.

As may be seen from the foregoing, the battery of the present invention has many advantages, such as superior heat dissipation or high strength and energy density.

Above all, by providing metal thin plates in the inside of the through-hole or providing a sealing plate having heat dissipating fins, heat dissipation under conditions of charging and discharging of large current may be achieved promptly, while the manufacture apparatus may be reduced in weight because there is no necessity of separately providing a cooling system in the apparatus.

What is claimed is:

1. A battery comprising a battery vessel having a central opening with an inner surface, a battery lid with an opening, a cylindrical part with an axially extending opening with an inner surface, and a spiral-shaped electrode made up of a strip-shaped positive electrode and a strip-shaped negative electrode wound about the cylindrical part a number of times with a separator therebetween, said spiral-shaped electrode being mounted in said battery vessel so that the axially extending opening of the cylindrical part is substantially coincident with the central opening of the vessel, said battery vessel being sealed after charging a liquid electrolyte therein by said battery lid with the axially extending opening of said lid being coincident with the opening of the lid, and cooling means comprising at least one heat-dissipating member being arranged on one of the inner surface of the axially extending opening and a surface of the lid.

2. A battery according to claim 1, wherein the heat-dissipating member is disposed on said inner surface.

3. A battery according to claim 1, wherein more than one heat-dissipating member is disposed on the inner surface.

4. A battery according to claim 1, wherein more than one heat-dissipating member is arranged on said lid around the opening therein.

5. A battery comprising a battery vessel having a central opening, a battery lid with an opening having heat-dissipating fins radiating therefrom, and a spiral-shaped electrode made up of a strip-shaped positive electrode and a strip-shaped negative electrode wound about a cylindrical part, which has an axially extending opening, a number of times with a separator therebetween, said spiral-shaped electrode being mounted in said battery vessel so that the axially extending opening of the cylindrical part is substantially coincident with the central opening, said battery vessel being sealed after charging a liquid electrolyte therein by said battery lid with the axially extending opening being coincident with the opening in the lid.

6. A battery comprising a battery vessel having a central opening, a cylindrical part with an axially extending opening with at least one heat-dissipating member disposed therein, a battery lid with an opening, and a spiral-shaped electrode made up of a strip-shaped positive electrode and a strip-shaped negative electrode wound about the cylindrical part a number of times with a separator therebetween, said spiral-shaped electrode being mounted in said battery vessel so that the axially-extending opening of the cylindrical part is substantially coincident with said central opening, said battery vessel being sealed after charging a liquid electrolyte therein by said battery lid with the axially extending opening being coincident with the opening of the lid.

7. A battery according to claim 6, which includes more than one heat-dissipating member disposed in said axially extending opening of the cylindrical part.

* * * * *